United States Patent [19]

Mahnke, Jr.

[11] 4,010,858
[45] Mar. 8, 1977

[54] METHOD AND MEANS FOR TOWING A VEHICLE
[75] Inventor: Carl F. Mahnke, Jr., Chicago, Ill.
[73] Assignee: Vicar Industries Incorporated, Chicago, Ill.
[22] Filed: July 14, 1975
[21] Appl. No.: 595,523
[52] U.S. Cl. .......................... 214/86 A; 267/140; 280/402
[51] Int. Cl.² .......................................... B60P 3/06
[58] Field of Search ............... 280/402; 214/86 A; 105/491, 489; 267/140, 141; 114/219

[56] References Cited

UNITED STATES PATENTS

| | | | |
|---|---|---|---|
| 2,555,663 | 6/1951 | Schoube | 214/86 A |
| 2,796,183 | 6/1957 | Cline et al. | 214/86 A |
| 3,762,585 | 10/1973 | Hobbs | 214/86 A |

FOREIGN PATENTS OR APPLICATIONS

| | | | |
|---|---|---|---|
| 982,574 | 2/1965 | United Kingdom | 280/402 |

*Primary Examiner*—Joseph F. Peters
*Assistant Examiner*—John A. Pekar
*Attorney, Agent, or Firm*—Zarley, McKee, Thomte & Voorhees

[57] ABSTRACT

A means for towing a vehicle comprises a towing cushion which is positioned between the towing member and the body structure for preventing the member from engaging the body structure. The towing cushion comprises an elongated yieldable, compressible cushion member extending transversely of the vehicle between the vehicle body and the towing member. The method of the present invention comprises securing a towing member to the vehicle and placing the towing cushion between the towing member and the vehicle to prevent injury to the vehicle body during lifting of the cable.

14 Claims, 18 Drawing Figures

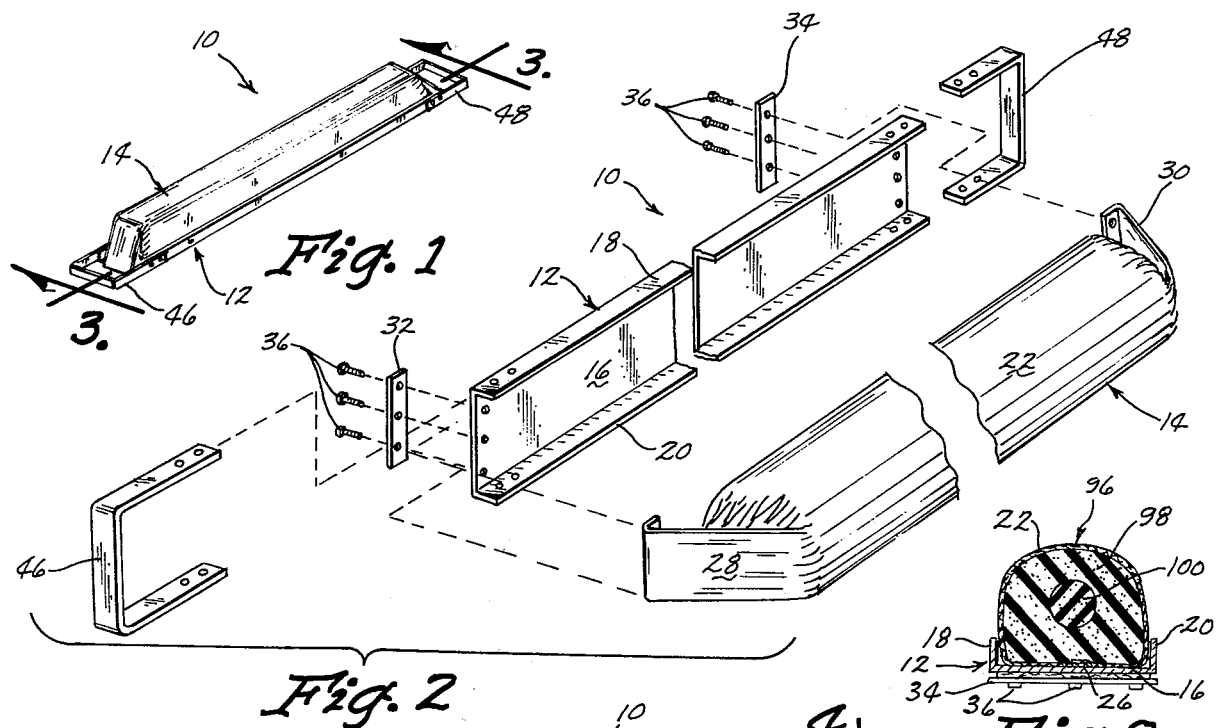
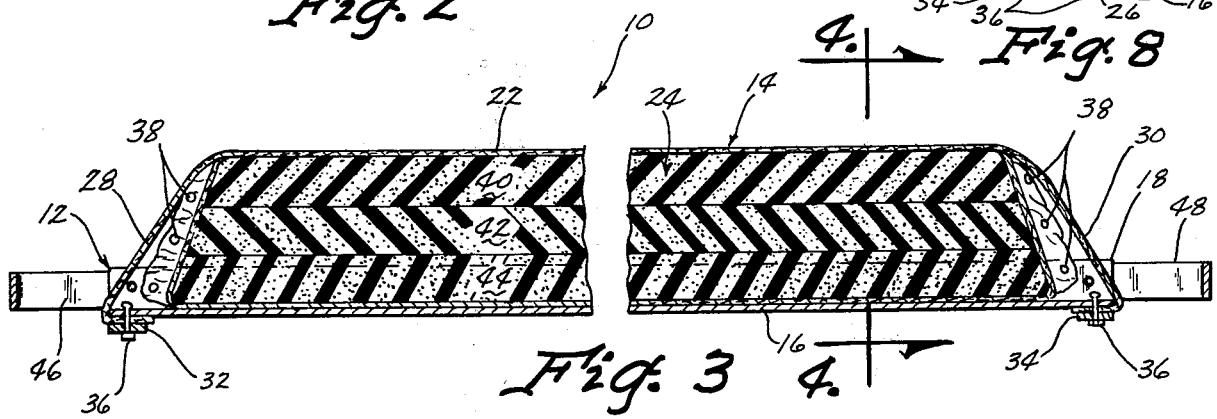
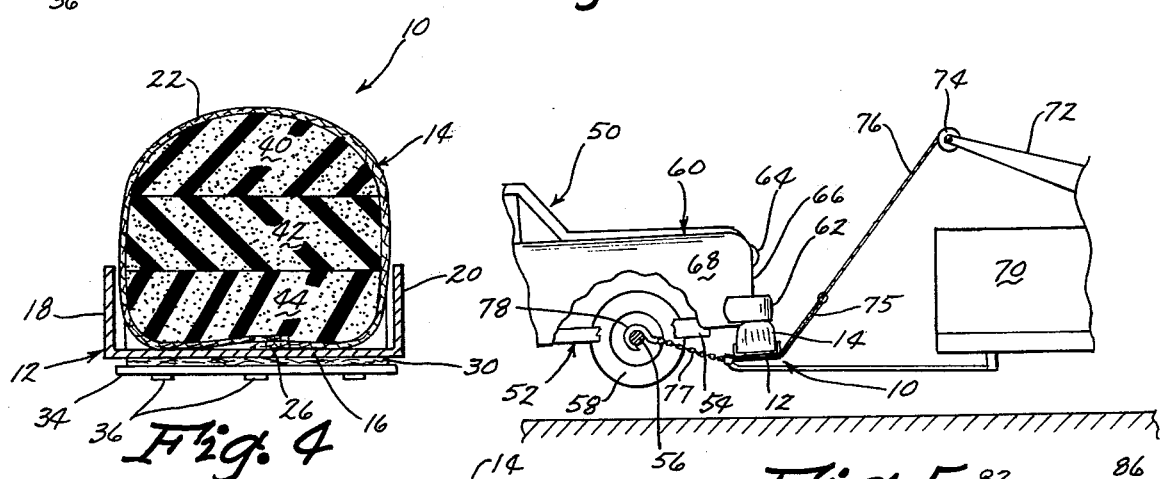

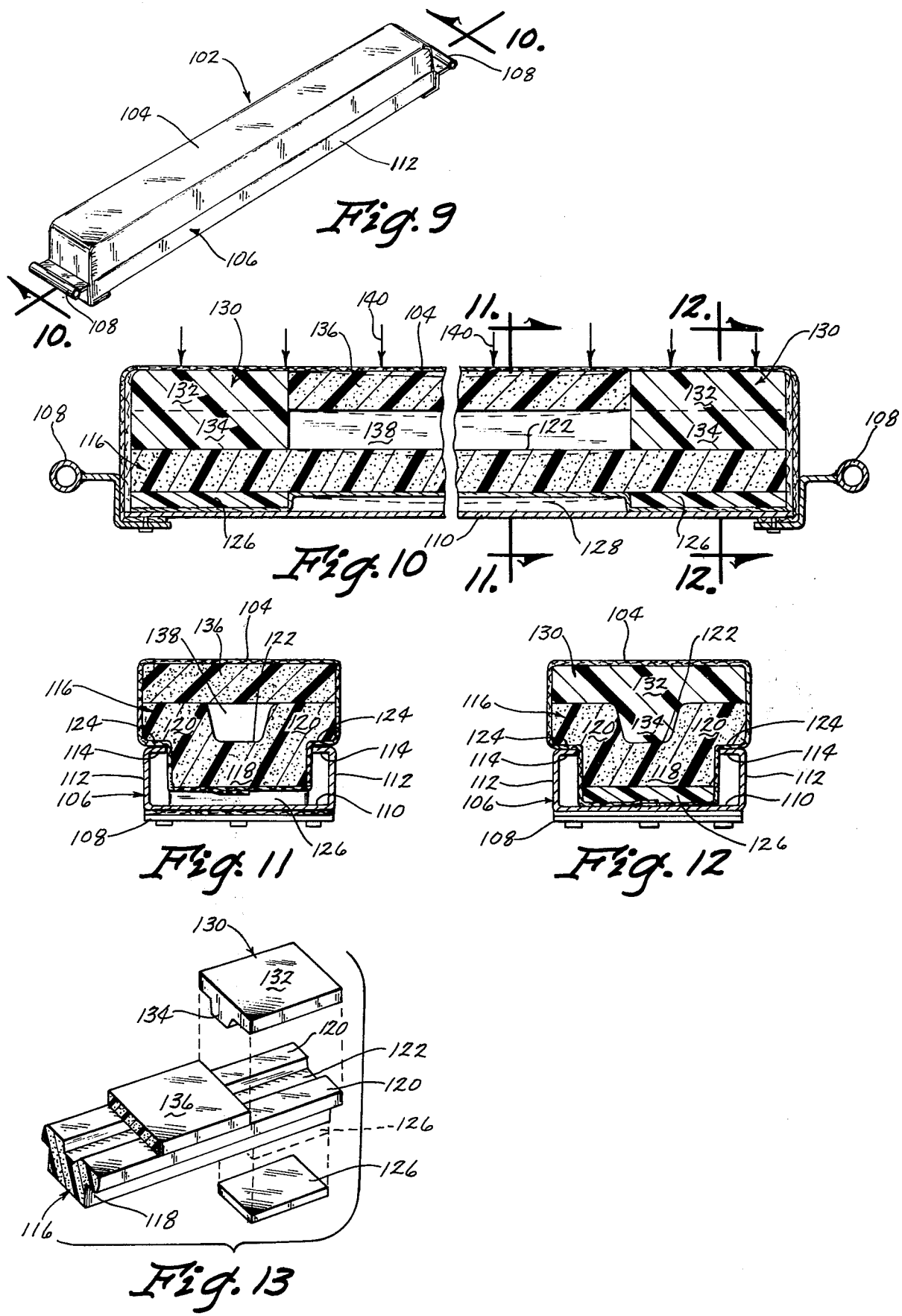

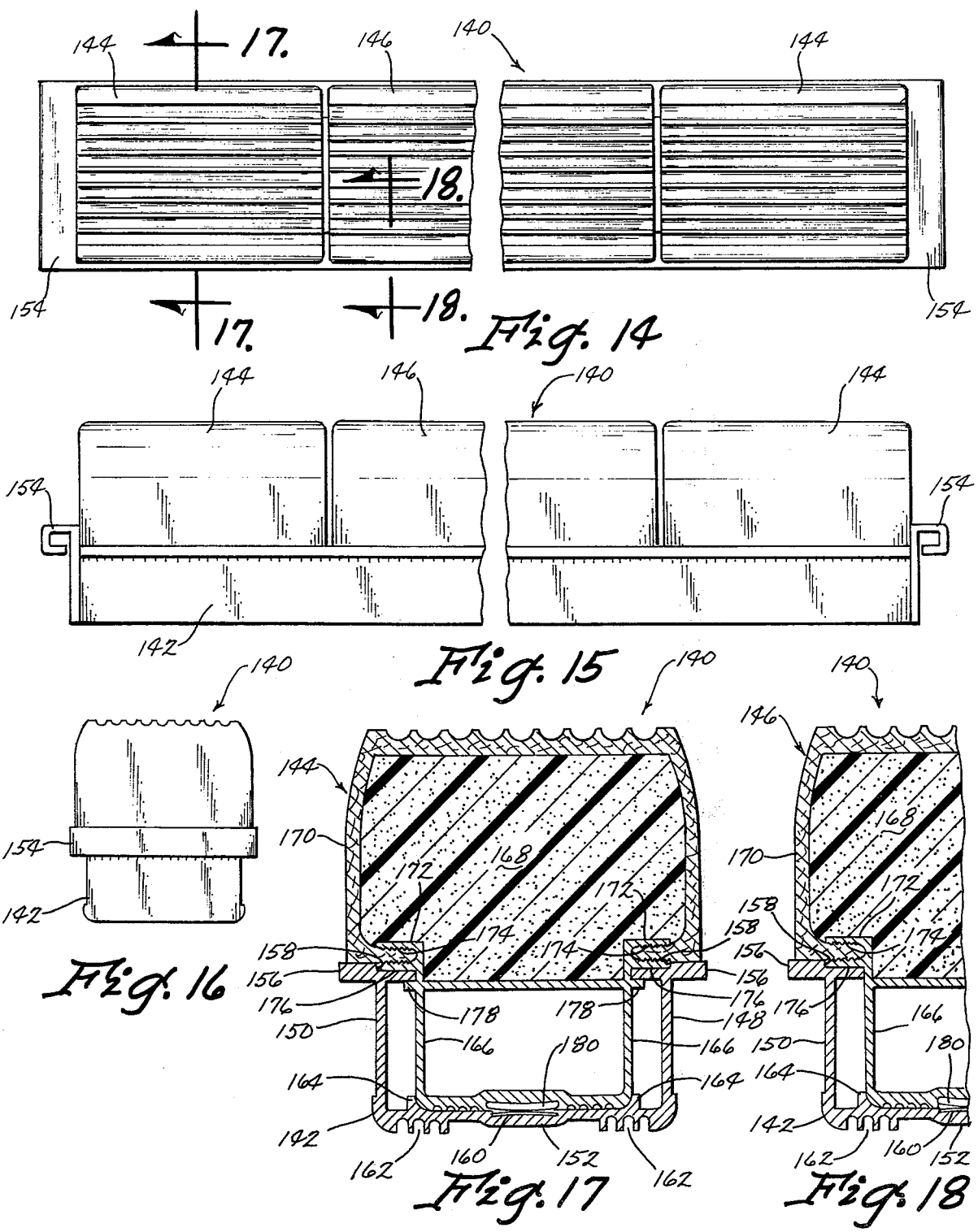

METHOD AND MEANS FOR TOWING A VEHICLE

SUMMARY OF THE INVENTION

This invention relates to a method and means for towing a vehicle. A common presently known method for towing a vehicle comprises hooking a towing member to the frame or axle of the vehicle, extending the towing member forwardly from the frame or axle and lifting the cable upwardly to lift the vehicle. Often such present methods result in damage to the vehicle body as a result of the towing member pressing against the body. Consequently, damage often results to the vehicle's gasoline tank, brake fluid lines, exhaust, radiator, air scoops, body trim, etc., during towing.

Sheathing the towing members to prevent such injury has not proved effective in view of the fact that such sheathing does not spread the pressure from the towing members over a wide enough area of the vehicle to prevent damage. Metal frame extension bar assemblies have also been provided for attaching to the axle and/or frame of the vehicle so as to hold the towing member out of engagement with the rest of the under body of the vehicle. Such metal tow bars are impractical, however, because they require the operator to reach beneath the vehicle and to fasten the bar to the vehicle frame. Furthermore, they are cumbersome to handle.

The present invention contemplates using a light cushion which is positioned between the cable and the body structure of the vehicle. The cushion protects the vehicle from the pressure from the cable and spreads the pressure so as to prevent damage to the vehicle.

Therefore, a primary object of the present invention is the provision of the new method and means for lifting vehicles for towing.

A further object of the present invention is the provision of a method and means for lifting vehicles for towing wherein damage to the vehicle body is minimized during lifting and towing.

A further object of the present invention is the provision of a means for lifting and towing vehicles which utilizes a cushion for protecting the vehicle body from the towing cables.

A further object of the present invention is the provision of a means for lifting and towing vehicles which permits the spreading of pressure between the cable and the vehicle so as to prevent damage to the vehicle.

A further object of the present invention is the provision of a device which affords stability to the vehicle during towing.

A further object of the present invention is the provision of a device which need not be secured to the vehicle, but which is held in place by pressure from the towing cable.

A further object of the present invention is the provision of a device which can be placed near the front or rear of the vehicle so as to eliminate the need for operator to reach under the vehicle.

A further object of the present invention is the provision of a device which is light and easy to carry.

A further object of the present invention is the provision of a device which may be positioned wherever it is needed to protect the vehicle.

A further object of the present invention is the provision of a device which holds its shape so that it can be positioned properly while at the same time being resilient so as to protect the vehicle body.

A further object of the present invention is the provision of a device which is economical to manufacture and durable in use.

BRIEF DESCRIPTION OF THE FIGURES OF THE DRAWINGS

FIG. 1 is a perspective view of the device of the present invention.

FIG. 2 is an exploded perspective view showing the various components of the towing cushion of the present invention.

FIG. 3 is a front elevational view of the towing cushion.

FIG. 4 is a sectional view taken along the line 4—4 of FIG. 3.

FIG. 5 illustrates the towing cushion in use.

FIG. 6 illustrates a modified handle for the cushion.

FIG. 7 is a perspective view of the handle of FIG. 6.

FIG. 8 is a sectional view of a modified form of the invention.

FIG. 9 is a perspective view of a further modified form of the invention.

FIG. 10 is a sectional view taken along line 10—10 of FIG. 3.

FIG. 11 is a sectional view taken along line 11—11 of FIG. 10.

FIG. 12 is a sectional view taken along line 12—12 of FIG. 10.

FIG. 13 is a partially exploded perspective view of the cushions in the device of FIGS. 9-12.

FIG. 14 is a top view of another modification of the present invention.

FIG. 15 is a front elevational view of the device of FIG. 14.

FIG. 16 is an end view of the device of FIGS. 14 and 15.

FIGS. 17 and 18 are sectional views taken along lines 17—17 and 18—18 of FIG. 14.

DETAILED DESCRIPTION

Referring to FIGS. 1-5, a towing cushion 10 comprises a rigid channel member 12 and an elongated pad member 14. Channel member 12 is U-shaped in cross section, having a web 16 extending between two upstanding spaced apart legs 18, 20. Channel member 12 is preferably constructed of aluminum material so as to provide maximum strength with minimum weight.

Pad member 14 comprises a flexible covering 22 which is tube-like in shape and which includes the yieldably compressible stuffing material 24 therein. Covering 22 may be fabric, vinyl plastic, or any other flexible material desired. It is shaped in a tube-like configuration with a longitudinal seam 26 being positioned downwardly facing web 16 of channel member 12. Legs 18 and 20 embrace the lower lateral sides of pad member 14, and pad member 14 extends a substantial distance upwardly above the upper edges of legs 18, 20. Covering 22 includes two flaps 28, 30 at opposite ends thereof which are adapted to be secured to channel member 12 by means of securing plates 32, 34 and bolts or rivets 36. The ends of covering 22 are folded beneath flaps 28, 30 at the ends of pad member 14 and are fastened together by staple means 38 so as to enclose the ends of pad member 14.

Stuffing material 24 is shown in the drawings to be three layers 40, 42, and 44 of foam rubber or plastic arranged in laminated form. While this configuration is preferred, a solid configuration may be utilized and also a stuffing comprised of plastic or rubber pebbles or peanuts may also be used in the place of layers 40, 42, and 44. It is also possible that air, gas, water, oil, or the like, could be used in the place of stuffing material 24. The primary requisite of stuffing material 24 is that it be sponge-like and resilient so as to yieldably compress in response to being pressed against the body and also so as to conform to the shape of the vehicle underbody. It is also important that the compressibility of the stuffing material be such that pad 14 will not be compressed far enough to cause the vehicle to come into engagement with legs 18, 20 of rigid member 12.

The cross sectional shape of pad member 14 may vary without detracting from the invention. The pad may be round, square, oval, or irregular in shape. The primary requisite is that it protrudes sufficiently far above legs 18, and 20 so as to prevent the vehicle from engaging legs 18, 20 during use.

A pair of handles 46, 48 are bolted or welded or otherwise secured to the opposite ends of channel member 12 so as to facilitate the handling of the towing cushion 10. These handles also provide means for securing cushion 10 to the towing truck to prevent theft or loss.

Referring to FIG. 5, a vehicle 50 is shown which for purposes of reference shall be described to include a chassis 52 having a frame 54, an axle 56, and wheels 58. Supported on chassis 52 is a body structure 60 having a front bumper 62, headlights 64, a grill 66 and a fender 68.

A towing vehicle 70 includes a boom 72 positioned with its distal end above and adjacent vehicle 50 and having a sheave 74 on its upper end. A towing cable 76 is operatively secured to boom 72, preferably by being trained over sheave 74, and extends downwardly toward vehicle 50. A sling 75 is secured to the end of cable 76 and a chain or pair of chains 77 are secured to sling 75. Securing means such as hooks 78 are provided on the lower end of chains 77 and are detachably secured to chassis 52. Hooks 78 may be secured to axle 56 or they may be secured to frame 54. Cable 76, sling 75 and chains 77 may be referred to collectively as a flexible towing member.

Towing cushion 10 is positioned between sling 75 and body structure 60. In FIG. 5, device 10 is shown positioned directly below bumper 62, but it is possible to move device 10 forwardly or rearwardly to any position which will protect vehicle 60 from engagement with sling 75 or chains 77.

In operation, power means (not shown) on towing vehicle 70 are actuated to draw cable 76 upwardly over sheave 74, thereby lifting vehicle 50. As the tension in cable 76 is increased, towing cushion 10 is compressed between body structure 50 and cable 76. The pressure from sling 75 and chains 77 is spread smoothly across the width of vehicle 50 and consequently minimizes the possibility of damage to body structure 60.

Thus it can be seen that the device accomplishes at least all of its stated objectives. Cushion 10 prevents damage to the vehicle body and spreads the pressure so as to eliminate such damage. Cushion 10 does not need to be fastened to the vehicle, but instead is held in place by the pressure between cable 76 and body 60. It is positioned near the front of the vehicle (or near the rear of the vehicle if rear towing methods are used) so that the operator does not have to reach under the vehicle to position it. It is light and easy to carry and can be positioned wherever needed. Rigid channel member 12 causes the device to hold its shape so that it can be positioned easily in the desired location beneath body structure 60. The vertical thickness of device 10 must be less than the height of body structure 60 above the surface which supports vehicle 50. This will permit the device 10 to be positioned beneath body structure 10 and will still leave sufficient space to permit cable 76 to extend below device 10.

Referring to FIGS. 6 and 7, a modified form of the invention is shown utilizing a different handle designated by the numeral 80. Handle 80 includes a tube-like handle member 82 and a plate 84 which is Z-shaped in cross section and includes upper and lower horizontal sections 86, 88 joined by vertical section 90. Horizontal section 88 performs the same function as securing plate 32 shown in FIG. 2, and may be secured to the under surface of rigid channel member 12 by means of rivets 92. Handle member 82 includes a longitudinal bore 94 extending therethrough which permits the device to be chained and padlocked or otherwise secured and locked to towing vehicle 70 when it is not in use.

Referring to FIG. 8, a modified configuration for the pad member is shown and designated by the numeral 96. Pad member 96 includes a stuffing material comprising an outer stuffing member 98 and an inner core member 100 which extends the length of the pad member 96 within outer member 98. Inner core 100 is comprised of a compressible material which is considerably more dense than outer stuffing member 98. Core 100 may also be comprised of a rigid non-compressible material. Thus outer member 98 will yieldably compress in response to a lesser pressure than will inner core 100. This configuration permits inner core 100 to provide reinforcement to the entire pad member 96 while at the same time permitting outer stuffing member 98 to absorb and spread the pressure between pad member 96 and the vehicle.

Referring to FIGS. 9-13, a modified form of the device is designated by the numeral 102. Device 102 includes a cushion member 104 and a channel member 106. At the end of channel member 106 are a pair of handles 108 which are identical to handles 80 shown in FIG. 6 and 7.

Channel member 106 in cross section includes a web 110 which interconnects two upstanding legs 112. The upper ends of legs 112 include inwardly turned flanges 114 so as to give channel member 106 a C-shaped appearance in cross section.

Cushion member 104 is comprised of a plurality of pad members. An elongated Y-shaped member 116 has a Y-shaped cross section comprised of a base 118 and two diverging arms 120 which form a trapezoidal groove 122 therebetween. Arms 120 also form two downwardly presented shoulders 124 which abut against flanges 114 of channel 106.

Positioned beneath Y-shaped member 116 at the opposite ends thereof are a pair of pedestal pads 126. Pedestal pads 126 rest on the web 110 of channel member 106 and support Y-shaped member 116. A space 128 (FIG. 10) is provided between the bottom of Y-shaped member 116 and web 110 of channel 106 between pedestals 126.

At the opposite ends of Y-shaped member 116 are a pair of T-shaped members 130 which in cross section include a cross bar 132 and upstanding trapezoidal leg 134 which is shaped to matingly fit within trapezoidal groove 122 of Y-shaped cushion member 116. The opposite ends of cross bar 132 rest upon and engage the upwardly presented surfaces of arms 120.

Spanning the distance between T-shaped members 130 is a rectangular pad member 136 which rests upon arms 120 and which forms a central space 138 within trapezoidal groove 122. T-shaped pad members 130 and pedestal pad members 126 are comprised of a dense material which is less compressible than the material of Y-shaped pad member 116 and rectangular pad member 136. Because T-shaped members 130 and pedestal members 126 are less compressible than the other pad members, they bear the greatest portion of the load from the vehicle being towed. Furthermore, these less compressible pad members are spaced apart, and consequently a bridging effect is obtained therebetween in response to forces which are applied to the cushion member between T-shaped members 130. Referring to FIG. 10, downward forces designated by the numeral 140 cause a bending moment to be exerted on the device 102 and cause rectangular pad member 136 and the central portion of Y-shaped pad member 116 to be deflected downwardly toward web 110 of channel member 106. Spaces 138 and 128 also contribute to the ability of the pad member to deflect adjacent its center portion. This is desirable so as to protect downwardly projecting portions of the vehicle which may engage the center portion of device 102. The more rigid portions of device 102 are provided at the ends thereof by T-shaped members 130. These T-shaped members 130 may therefore be positioned adjacent the springs of the vehicle so as to bear the load at a point on the vehicle which is least likely to cause damage thereto.

Pads 130 and 126 are preferably made of polyethylene foam having a 6-pound density and being capable of compressing 9% under a 10-lb. square inch load. Pads 116 and 136 are preferably made of polyethylene foam having a 2 lb. density and being capable of compressing 40% under a 10 lb. square inch load.

Referring to FIGS. 14-18, a further modification of the invention is designated by the numeral 140. Cushion 140 includes a base channel 142, two sliding end cushions 144, and an upwardly removable middle cushion 146.

Base panel 142 comprises in cross section front and rear walls 148, 150 and a bottom wall 152. At opposite ends of base channel 142 are a pair of handles 154. At the upper edges of front and rear walls 148, 150 are a pair of spaced apart horizontal slide flanges 156 which include inwardly presented shoulders 158 for forming an elongated slide track. In the bottom wall 152 of base channel 142 is a magnet 160, and formed on the under surface of bottom wall 152 are a plurality of elongated chain grooves 162 which extend parallel to the longitudinal axis of device 140 so as to extend in a direction transversely to the direction of chains 77 (FIG. 5). Spaced apart and extending upwardly from the upper surface of bottom wall 152 are a pair of rounded guide flanges 164.

The structure of end cushion 144 is shown in cross section in FIG. 17. Cushion 144 includes a slide channel 166 which is connected to a pad member comprised of foam stuffing 168 and a polyvinyl chloride shell 170. A pair of F-shaped flanges 172 include a plurality of teeth 174 which engage the edges of the polyvinyl chloride shell 170 so as to secure slide channel 166, stuffing 168 and shell 170 into an integral unit.

The two F-shaped flanges 172 form a downwardly presented slide surface 176 which engages slide flanges 156 and which permits slide channel 166 to slide longitudinally within the track formed between shoulders 158 of slide flanges 156. Slide channel 166 is also provided with a retaining flange 178 which slidably engages the under surface of slide flanges 156 so as to lock slide channel 166 against upward movement away from base channel 142.

FIG. 18 illustrates the cross sectional structure of middle cushion 146, and this structure is identical to the cross sectional structure of slide channel 166 with the exception that the channel of middle cushion 146 does not include a retaining flange 178. Corresponding numerals are used to designate corresponding parts in FIGS. 17 and 18. Thus, middle cushion 140 may be removed upwardly so as to permit end cushions 144 to be moved longitudinally along the length of base channel 142, thereby accommodating vehicles of varying width. Slide channels 166 are provided with downwardly presented magnets 180 which are registered with magnet 160 so as to yieldably hold channels 166 against sliding movement within base channel 142 and also to retain middle cushion 146 from falling out. Rounded guide flanges 164 slidably embrace the bottom corners of slide channels 166. The middle cushion can be removed and used as a towing pad in and of itself for smaller vehicles.

Thus, it can be seen that the device accomplishes at least all of its stated objectives.

What is claimed is:
1. A device of the kind described comprising,
a vehicle comprising a chassis and a body structure mounted above said chassis having opposite ends and wheels adjacent said opposite ends, said body structure having opposite end portions extending beyond said ends of said chassis;
boom means having one end above and adjacent one end of said body structure;
at least one elongated flexible towing member having securing means on one end thereof, said securing means being detachably secured to said chassis adjacent one end thereof and said towing member extending from said point of attachment outwardly below and beyond said end portion of said body structure, and thence upwardly to said boom means;
power means associated with said boom means and connected to said towing member for pulling said towing member upwardly to said boom means to cause lifting of said one end of said vehicle;
a towing cushion positioned between said towing member and said body structure for preventing said towing member from engaging said body structure, said towing cushion comprising an elongated yieldably compressible cushion member extending transversely of said vehicle;
said towing cushion comprising an elongated rigid member secured to said cushion member, said rigid member being below said cushion member and engaging said towing member, said rigid member in cross section having a horizontal web and a pair of upstanding legs which form a U-shape, said rigid member having handles secured to its opposite ends.

2. A device according to claim 1 wherein said cushion member comprises an outer flexible wall and a flexible stuffing material enclosed within said flexible wall.

3. A device according to claim 1 wherein said cushion member is elongated and lies between the upstanding legs of said U-shaped rigid member, securing means fastening said opposite ends of said cushion member to the opposite ends of said rigid member.

4. A device according to claim 1 wherein said cushion is pressed upwardly against said body structure by said towing member and is free from other means of securement to said vehicle.

5. A device according to claim 1 wherein said body structure is supported a predetermined distance above a supporting surface by said wheels, said cushion having a vertical thickness less than said predetermined distance.

6. A device according to claim 1 wherein said handles comprise elongated tube members having bores extending longitudinally therethrough.

7. A device of the kind described comprising,
a vehicle comprising a chassis and a body structure mounted above said chassis having opposite ends and wheels adjacent said opposite ends, said body structure having opposite end portions extending beyond said ends of said chassis;
boom means having one end above and adjacent one end of said body structure;
at least one elongated flexible towing member having securing means on one end thereof, said securing means being detachably secured to said chassis adjacent one end thereof, and said towing member extending from said point of attachment outwardly below and beyond said end portion of said body structure, and thence upwardly to said boom means;
power means associated with said boom means and connected to said towing member for pulling said towing member upwardly to said boom means to cause lifting of said one end of said vehicle;
a towing cushion positioned between said towing member and said body structure for preventing said towing member from engaging said body structure, said towing cushion comprising an elongated yieldably compressible cushion member extending transversely of said vehicle;
said cushion member comprising an elongated compressible outer member and an elongated compressible inner core extending along the longitudinal axis thereof, said outer member being compressible in response to less pressure than said inner core.

8. A device of the kind described comprising,
a vehicle comprising a chassis and a body structure mounted above said chassis having opposite ends and wheels adjacent said opposite ends, said body structure having opposite end portions extending beyond said ends of said chassis;
boom means having one end above and adjacent one end of said body structure;
at least one elongated flexible towing member having securing means on one end thereof, said securing means being detachably secured to said chassis adjacent one end thereof and said towing member extending from said point of attachment outwardly below and beyond said end portion of said body structure, and thence upwardly to said boom means;
power means associated with said boom means and connected to said towing member for pulling said towing member upwardly to said boom means to cause lifting of said one end of said vehicle;
a towing cushion positioned between said towing member and said body structure for preventing said towing member from engaging said body structure, said towing cushion comprising an elongated yieldably compressible cushion member extending transversely of said vehicle;
said towing cushion member comprising a plurality of pad members, at least two of said pad members being at opposite ends of said cushion member and being capable of compressing less than the remaining pad member in response to a predetermined pressure.

9. A device according to claim 8 wherein said two pad members compress approximately 9% in response to a 10 lb. psi load.

10. A device according to claim 8 wherein said two pad members comprise a pair of spaced apart pedestal pads positioned at opposite ends of said tow cushion in engagement with said rigid member, said remaining pad member resting on said pedestal pads and spanning the distance therebetween so as to form a space between said additional pad member and said rigid member.

11. A device of the kind described comprising,
a vehicle comprising a chassis and a body structure mounted above said chassis having opposite ends and wheels adjacent said opposite ends, said body structure having opposite end portions extending beyond said ends of said chassis;
boom means having one end above and adjacent one end of said body structure;
at least one elongated flexible towing member having securing means on one end thereof, said securing means being detachably secured to said chassis adjacent one end thereof and said towing member extending from said point of attachment outwardly below and beyond said end portion of said body structure, and thence upwardly to said boom means;
power means associated with said boom means and connected to said towing member for pulling said towing member upwardly to said boom means to cause lifting of said one end of said vehicle;
a towing cushion positioned between said towing member and said body structure for preventing said towing member from engaging said body structure, said towing cushion comprising an elongated yieldably compressible cushion member extending transversely of said vehicle;
said towing cushion comprising a rigid elongated base member, a pair of end cushions being mounted at opposite ends thereof and a middle cushion being mounted between said end cushions.

12. A device according to claim 11 wherein said middle cushion is removable from said elongated base member, said end cushions being movably mounted to said base member for sliding movement along the length thereof.

13. A device according to claim 12 wherein each of said end cushions and said middle cushion comprise a rigid channel member and a flexible pad mounted on the upper surface of said channel.

14. A device according to claim 13 wherein said base member comprises an elongated track formed by a pair of slide flanges, said channel members of said end cushions having retaining flanges engaging said slide flanges positioned to prevent upward removal of said end cushions from said track while at the same time permitting sliding movement of said end cushions along said track.

* * * * *